United States Patent [19]

Mazéré

[11] 4,369,218
[45] Jan. 18, 1983

[54] FELT FOR DEHYDRATION OF A FIBER WEB

[75] Inventor: Michel Mazéré, Riberac, France

[73] Assignee: Albany International Corp., Menands, N.Y.

[21] Appl. No.: 153,143

[22] Filed: May 27, 1980

[30] Foreign Application Priority Data

May 29, 1979 [FR] France ................ 79 13581

[51] Int. Cl.³ .............. B32B 5/08; B32B 5/12; B32B 5/26
[52] U.S. Cl. .................... 428/91; 34/116; 34/123; 139/383 A; 162/358; 162/DIG. 1; 428/95; 428/233; 428/280
[58] Field of Search ............ 34/116, 123; 139/383 A; 162/358, DIG. 1; 428/91, 95, 233, 280

[56] References Cited

U.S. PATENT DOCUMENTS 3,613,258  10/1971  Jamieson ................. 162/358
4,119,753  10/1978  Smart ..................... 139/383 A
4,187,618  2/1980  Diehl ..................... 162/358

FOREIGN PATENT DOCUMENTS 1220531  1/1971  United Kingdom .

Primary Examiner—James C. Cannon
Attorney, Agent, or Firm—Kane, Dalsimer, Kane Sullivan & Kurucz

[57] ABSTRACT

The present invention relates to a felt for dehydration of a fiber web, preferably an asbestos fiber web in a machine for manufacturing of asbestos cement pipes, which felt being in the form a two layered fabric, one of the layers constitutes the upper layer and is closest to the fiber web. It is desirable to improve known felts in order to reduce their susceptibility to be filled up and worn out.

Such a technical problem is solved in accordance with the present invention by a combination of twisted yarn threads of spun staple fibers and monofilament threads, said twisted yarn threads of spun staple fibers in at least the upper layer being roughened.

1 Claim, 1 Drawing Figure

U.S. Patent     Jan. 18, 1983     4,369,218
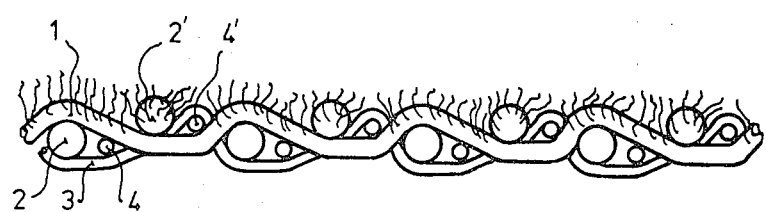

FELT FOR DEHYDRATION OF A FIBER WEB

The present invention relates to a felt for dehydration of a fiber web, preferably as asbestos cement fiber web in a machine for manufacturing of asbestos cement pipers, which felt being in the form of a two layered fabric, one of the layers contituting the upper layer and being closest to the fiber web.

BACKGROUND OF THE INVENTION

Known felts for use in machines for manufacturing of asbestos cement pipes have the form of a fabric with one layer of relatively heavy twisted yarn threads of spun staple fibers and one side of the felt being roughened. The main disadvantage of such known felts is that they are filled up quickly and have to be replaced. This disadvantage is more apparent with needled felts and especially in connection with use of such known felts in machines for manufacturing of asbestos cement pipes, when the machines are provided with fan-driven suction boxes instead of vacuum pump driven suction boxes. On the market the number of machines with fan-driven suction boxes is increasing and therefore the need for better felts increases. A further disadvantage of the known felts is their relatively short useful life due to wearing.

THE OBJECTIVE OF THE INVENTION

One goal of the present invention is to improve known felts in order to at least partly reduce the disadvantages with them.

SUMMARY OF THE INVENTION

Such a goal is reached in accordance with the present invention in that the felt disclosed is characterized by the combination of twisted yarn threads of spun staple fibers and monofilament threads, said twisted yarn threads of spun staple fibers in at least the upper layer being roughened.

The combination of twisted yarn threads of spun staple fibers and monofilament threads provides a felt with longer lifetime both in respect of wearing and filling because the monofilament threads keep the roughened yarn threads of stapel fibers separated, so that the susceptibility of the felt to filling is reduced and it is easier to keep the felt open. Furthermore, such a felt is given a longer wearing life.

DESCRIPTION OF THE DRAWING

The FIGURE on the enclosed drawing shows a cross section of a part of one embodiment of a felt according to the present invention.

PREFERRED EMBODIMENT

The embodiment of the present invention comprises a number of warp threads 1 and 3 and a number of weft threads 2 and 4. The warp threads 1 and the weft threads 2 comprise twisted yarn threads of spun staple fibers and the warp threads 3 and the weft threads 4 comprise twisted monofilament threads.

As shown on the drawing, the upper layer comprises a twisted warp thread 1 of spun staple fibers and a twisted weft thread 2 of spun staple fibers and the lower layer comprises a twisted monofilament warp thread 3 and a twisted monofilament weft thread 4. The two layers are connected to each other by threading the warp thread 1 down under alternate weft threads 4'. The closest warp thread is also threaded down under alternate weft threads 4 (not shown).

In the embodiment shown the weft thread 2 is heavier than the other threads in the felt for providing a thicker fiber layer by roughening the upper layer of the staple fiber yarn threads.

The staple fiber yarn threads 1 and 2 will be kept apart by the monofilament threads 3 and 4, whereby the suseptibility for filling will be restricted and the filling will be greatly reduced.

As shown, the staple fiber yarn threads 1 and 2 in the upper layer are roughened. The upper layer constitutes the side of the felt closest to the fiber web to be dehydrated. Preferably the fiber web comprises of an asbestos fiber cement web for manufacturing of asbestos cement pipes.

The lifetime of the felt is improved considerably due to the monofilament threads 3 and 4 in the main part of the under side of the felt.

The monofilament threads can be manufactured of a suitable synthetic material. The staple fiber yarn threads can also be manufactured of a synthetic material or a natural material.

I claim:
1. Felt for dehydration of a fiber web, preferably an asbestos fiber web in an asbestos pipe manufacturing machine, comprising a fabric having a roughened upper layer and a lower layer;
   the upper layer warp and weft being composed of twisted threads of staple;
   the lower layer warp and weft being composed of twisted threads of monofilament;
   the upper and lower layers being joined by threading warp thread of the upper layer down under weft threads of the lower layer;
   the monofilament threads serving to space the staple threads apart to restrict filling.

* * * * *